(12) United States Patent
Jung (10) Patent No.: US 11,958,095 B2
(45) Date of Patent: Apr. 16, 2024

(54) PEENING APPARATUS AND METHOD OF PEENING USING THE SAME

(71) Applicant: INDUSTRY-ACADEMIC COOPERATION FOUNDATION, DANKOOK UNIVERSITY, Yongin-si (KR)

(72) Inventor: Sunghwan Jung, Anyang-si (KR)

(73) Assignee: INDUSTRY-ACADEMIC COOPERATION FOUNDATION, DANKOOK UNIVERSITY, Yongin-si (KR)

(*) Notice: Subject to any disclaimer, the term of this patent is extended or adjusted under 35 U.S.C. 154(b) by 14 days.

(21) Appl. No.: 17/888,696

(22) Filed: Aug. 16, 2022

(65) Prior Publication Data

US 2023/0070535 A1 Mar. 9, 2023

(30) Foreign Application Priority Data

Sep. 6, 2021 (KR) .......................... 10-2021-0118486

(51) Int. Cl.
*C21D 7/06* (2006.01)
*B21D 31/06* (2006.01)
*B24C 5/00* (2006.01)

(52) U.S. Cl.
CPC .............. *B21D 31/06* (2013.01); *B24C 5/005* (2013.01); *C21D 7/06* (2013.01)

(58) Field of Classification Search
CPC ....... B24C 3/325; B24C 5/005; B24C 7/0038; B24C 7/0076; B24C 7/0084; C21D 7/06; B21D 26/06; B21D 31/06; Y10T 29/49806

(Continued)

(56) References Cited

U.S. PATENT DOCUMENTS 3,399,702 A * 9/1968 Kenmore ................ C23G 3/022
  72/39
3,557,590 A * 1/1971 Erlandson .............. B21D 26/12
  72/63

(Continued)

FOREIGN PATENT DOCUMENTS

WO 2008/152717 A * 12/2008 ................ C21D 7/06

OTHER PUBLICATIONS

CN 113502388A, Wang et al. Oct. 2021.*
KR 101690890B1, Jung Dec. 2016.*

*Primary Examiner* — Edward T Tolan
(74) *Attorney, Agent, or Firm* — LEX IP MEISTER, PLLC (57) ABSTRACT

According to an aspect of the disclosure, there may be provided a peening apparatus for generating a compressive residual stress on a pipe member including at least one curved round portion and having a hollow inside formed therein in which a first fluid and a second fluid, which is in a gas phase, are accommodated, the apparatus including: a probe which is disposed such that it is submerged in the first fluid supplied to the hollow inside, and which is configured to apply a wave to the first fluid, wherein the first fluid and the second fluid have different acoustic impedances, so that the wave is totally reflected on a reflection surface where the first fluid and the second fluid are in contact, and forms a standing wave, and wherein a cavity generated and grown by the formed standing wave is exploded and emits a shock wave or microjet, which generates a compressive residual stress on the inner surface of the pipe member surrounding the hollow inside.

14 Claims, 9 Drawing Sheets

(58) Field of Classification Search
USPC .............................................. 72/53, 56, 706
See application file for complete search history.

(56) References Cited

U.S. PATENT DOCUMENTS

| | | | | | |
|---|---|---|---|---|---|
| 3,603,127 | A | * | 9/1971 | Seiffert | B21D 26/12 |
| | | | | | 72/56 |
| 3,800,578 | A | * | 4/1974 | Brennan | B21D 26/06 |
| | | | | | 72/63 |
| 5,339,666 | A | * | 8/1994 | Suzuki | B23K 20/08 |
| | | | | | 29/421.2 |
| 6,315,646 | B1 | * | 11/2001 | Hoyashita | B23F 19/00 |
| | | | | | 451/37 |
| 8,875,553 | B2 | * | 11/2014 | Zak | B21D 26/08 |
| | | | | | 72/706 |
| 9,636,736 | B2 | * | 5/2017 | Zak | B21D 39/042 |
| 2010/0175449 | A1 | * | 7/2010 | Stranz | B21D 26/12 |
| | | | | | 72/430 |
| 2019/0143471 | A1 | * | 5/2019 | Jung | C21D 7/06 |
| | | | | | 148/525 |

\* cited by examiner

PEENING APPARATUS AND METHOD OF PEENING USING THE SAME

CROSS-REFERENCE TO RELATED APPLICATION(S)

This application claims priority to and the benefit of Korean Patent Application No. 10-2021-0118486 filed on Sep. 6, 2021 and Korean Patent Application No. 10-2022-0000156 filed on Jan. 3, 2022 the disclosure of which are incorporated herein by reference in its entirety.

TECHNICAL FIELD

This disclosure relates to a peening apparatus and a peening method using the same, and more particularly, to a peening apparatus capable of generating a compressive residual stress by peening an inner surface surrounding a hollow inside formed in a pipe or a spring, or the like, and a peening method using the same.

BACKGROUND

A hollow inside is formed in the pipe. The fluid may be transferred from one member to another member through the hollow inside.

The hollow inside formed in the pipe reduces the strength of the pipe itself. That is, when the cross-section of the pipe is considered, the cross-sectional area is reduced by the cross-sectional area of the hollow inside formed therein, so that the weight reduction can be achieved. In the case of a hollow spring subjected to repeated loads in addition to weight reduction, fatigue strength above a certain standard must be achieved for both the outer wall (outer surface) and the inner wall (inner surface). As a way of doing this, techniques for outer and inner surface treatment have been introduced.

The outer and inner surface treatment is a technique for increasing the fatigue strength of a pipe by generating a compressive residual stress on the outer surface and inner surface of the pipe. As for a commonly used shot peening, the outer and inner surfaces of a pipe undergo the hammering by projecting small-sized steel balls called shot balls thereon. Accordingly, a compressive residual stress is generated on the outer and inner surfaces of the shot-peened pipe, so that the fatigue strength of the pipe may be increased.

In particular, when the cross section of the hollow inside formed in the pipe is very small, or when the pipe has a complicated shape including a curved portion, it is not easy to insert such apparatus for shot peening, laser peening and water jet peening.

A hollow coil spring may be included as an example. Conventional coil springs are formed by bending a bar-shaped base material having no hollow inside, whereas hollow coil springs are formed by bending a pipe-shaped base material having a hollow inside.

Therefore, on the premise that the hollow coil spring has the same elastic modulus as the conventional coil spring, it is possible to reduce the weight by the mass of the base material corresponding to the hollow volume. Accordingly, hollow coil springs are more advantageous than conventional coil springs for products requiring weight reduction of members to improve fuel efficiency and energy efficiency, such as vehicles, railroad vehicles, and aircraft.

However, after bending process is performed, it is difficult to insert an apparatus for performing shot peening, or the like onto the hollow inner wall of the hollow coil spring.

Therefore, techniques for processing the inner surface of the member extending in a curved shape have been introduced.

Korean Patent Laid-Open Publication No. 10-2005-0086683 discloses a method for improving the strength of a cold worked part by ultrasonic impact treatment and a metal product having high fracture toughness and fatigue strength. Specifically, a technique for performing a peening operation on the inner surface of a pipe using ultrasonic waves is disclosed.

However, the aforementioned prior literature discloses only a straight metal tube as a work target. That is, the technology proposed by the aforementioned prior literature is difficult to be applied to the inner wall of a curved pipe, tube, or spring.

U.S. Patent Publication No. 2006/0021410 discloses Shot, apparatuses, and installations for ultrasonic peening, and parts treated thereby. Specifically, a technique for peening the inner wall of a part using a sonotrode is disclosed.

However, the aforementioned prior literature also limits the target to a part having a shallow inner wall that requires a peening process. That is, the technology proposed by the aforementioned prior literature is also difficult to generate compressive residual stress on the inner wall of a curved long pipe, tube, or spring.

Additionally, in the aforementioned prior literature, peening is performed by impacting the inner surface of a work target with the shot balls which are excited by the sonotrode, and it can be applied only to a member whose one end in the extension direction is closed.

Therefore, it is difficult to apply the aforementioned prior literatures to process the inner surface of a pipe or a hollow coil spring extending to include one or more curved portions.

DOCUMENTS OF RELATED ART

Patent Document

Korean Patent Laid-Open Publication No. 10-2005-0086683 (Aug. 30, 2005)
U.S. Patent Publication No. 2006/0021410 (Feb. 2, 2006)

SUMMARY

An objective of this disclosure is to provide a peening apparatus capable of addressing the above-described problems and a peening method using the same.

First, an objective of this disclosure is to provide a peening apparatus capable of manufacturing a hollow pipe, or the like, which has sufficient fatigue strength on the inner surface while being lightweight, and a peening method using the same.

Additionally, another object of this disclosure is to provide a peening apparatus capable of generating a compressive residual stress on an inner surface of a hollow pipe, or the like, and a peening method using the same.

Also, still another objective of this disclosure is to provide a peening apparatus capable of generating a compressive residual stress on an inner surface of a member having a complicated shape, such as a curved pipe or a spring, and a peening method using the same.

Additionally, still another objective of this disclosure is to provide a peening apparatus capable of easily and precisely adjusting a position where a compressive residual stress is generated on an inner surface of a pipe with a hollow inside formed therein, and a peening method using the same.

Also, still another objective of this disclosure is to provide a peening apparatus capable of maximizing the magnitude of the compressive residual stress generated on the inner surface of a pipe with a hollow inside formed therein, or the like, and a peening method using the same.

According to an aspect of this disclosure, there is provided a peening apparatus for generating a compressive residual stress on a pipe member including at least one curved round portion and having a hollow inside formed therein in which a first fluid and a second fluid, which is in a gas phase, are accommodated, the apparatus including: a probe which is disposed such that it is submerged in the first fluid supplied to the hollow inside, and which is configured to apply a wave to the first fluid, wherein the first fluid and the second fluid have different acoustic impedances, so that the wave is totally reflected on a reflection surface where the first fluid and the second fluid are in contact, and forms a standing wave, and wherein a cavity generated and grown in the pressure antinode of the formed standing wave is exploded and emits a shock wave or microjet, which generate a compressive residual stress to the inner surface of the pipe member surrounding the hollow inside.

Additionally, there may be provided the peening apparatus, wherein a plurality of pressure antinodes are formed to be spaced apart from each other by a predetermined distance along the inner surface of the pipe member, and wherein the cavity is grown to a critical volume at the plurality of pressure antinodes, and then is exploded.

Additionally, there may be provided the peening apparatus further including a controller in communication with the hollow inside in the pipe member, and configured to change the pressure or supply amount of the second fluid accommodated in the hollow inside.

Additionally, there may be provided the peening apparatus, wherein when the pressure or supply amount of the second fluid in the hollow inside is controlled, the position of the reflection surface is moved along the direction of the pipe member (P).

Additionally, there may be provided the peening apparatus further including a power unit which is connected to the probe and the pipe member, and which is configured to rotate the probe and the pipe member together.

Additionally, there may be provide the peening apparatus, wherein as the probe and the pipe member are rotated together while keeping the pressure of the second fluid constant, the position of the reflection surface is adjusted while the angle between the reflection surface and the inner surface of the pipe member is maintained at a predetermined angle.

Additionally, there may be provided the peening apparatus further including a tank member accommodating the first fluid and the pipe member, wherein the pipe member is disposed such that it is submerged in the first fluid accommodated in the tank member.

Additionally, there may be provided the peening apparatus wherein the power unit is configured to rotate the probe, the pipe member, and the tank member accommodating the pipe member, together.

Additionally, there may be provided the peening apparatus wherein the reflection surface is provided as a plate member or a membrane member of a solid phase inserted into the hollow inside.

Additionally, according to an aspect of this disclosure, there may be provided a peening method for generating a compressive residual stress to a pipe member including at least one curved round portion and having a hollow inside formed therein in which a first fluid and a second fluid, which is in a gas phase, are accommodated, the method including: (a) injecting the first fluid and the second fluid into the hollow inside formed in the pipe member; (b) forming a standing wave in the first fluid injected into the hollow inside of the pipe member and forming a cavity in the pressure antinode of the standing wave; (c) generating a compressive residual stress to the inner surface of the pipe member by the formed cavity being exploded; and (d) controlling the position of a pressure antinode of a standing wave.

Additionally, there may be provided the peening method wherein the step (a) includes (a1) connecting a fluid supply unit in fluid communication with the pipe member; (a2) supplying, by the fluid supply unit, the first fluid to the hollow inside through one end of the pipe member; (a3) supplying, by the fluid supply unit, the second fluid to the hollow inside through the other end of the pipe member in the extending direction; and (a4) forming a reflection surface formed on a portion in which the first fluid and the second fluid are in contact to each other.

Additionally, there may be provided the peening method wherein the step (b) includes (b1) locating a probe adjacent to one end among the ends of the hollow inside, in which the first fluid is accommodated; (b2) applying the wave to the first fluid by the probe; (b3) forming a standing wave by the wave being totally reflected on a reflection surface formed in a portion where the first fluid and the second fluid are in contact, while forming the pressure antinode on the inner surface of the pipe member; and (b4) forming the cavity in the pressure antinode of the standing wave.

Additionally, there may be provided the peening method, wherein the number of the pressure antinodes (AN) of the standing wave is plural, and they are formed spaced apart from each other on the inner surface along the extending direction of the pipe member (P), and wherein the step (c) includes (c1) growing the cavity at the positions of a plurality of the pressure antinodes; (c2) exploding the cavity by growing the cavity to a critical volume or more; and (c3) generating a compressive residual stress on the inner surface of the pipe member by a shock wave or microjet generated by the explosion of the cavity.

Additionally, there may be provided the peening method wherein the step (d) includes (d1) controlling, by a controller, the pressure or supply amount of the second fluid accommodated in the hollow inside (d2) controlling the relative volumes of the first fluid and the second fluid accommodated in the hollow inside by controlling the pressure or supply amount of the second fluid; (d3) controlling the position of a reflection surface formed at a portion where the first fluid and the second fluid are in contact; and (d4) controlling the position of the pressure antinode of a standing wave formed by total reflection of the wave on the reflection surface.

Additionally, there may be provided the method wherein the step (d) includes, after step (d2) and before step (d3), maintaining an angle between the reflection surface and the inner surface constant by the controller maintaining the pressure of the second fluid constant, and rotating the pipe member, a probe for applying the wave to the pipe member, and a tank member.

Additionally, there may be provided the peening method wherein the step (d2') includes (d21') connecting a power unit to the pipe member, the probe, and the tank member accommodating the pipe member; and (d22') rotating, by the power unit, the pipe member, the probe, and the tank member.

According to the embodiments of this disclosure, the following effects can be achieved.

First, the peening apparatus and the peening method using the same according to an embodiment of this disclosure can generate a compressive residual stress to an inner surface of a pipe or a spring with a hollow inside formed therein, that is, to an inner surface surrounding the hollow inside. Accordingly, by forming a hollow inside, it can be formed to have sufficient fatigue strength even on the inner surface of a pipe or a spring.

In addition, as the hollow inside is formed, the weight of the pipe or the spring can be reduced by a reduction in the cross-sectional area and volume thereof. Accordingly, weight reduction of pipes or springs or the like can also be achieved.

As a result, the hollow pipe or spring can be formed to have sufficient fatigue strength even on the inner surface and to be lightweight. Accordingly, the pipe or spring whose inner surface is treated by the peening apparatus according to an embodiment of this disclosure and the peening method using the same can be applied to various products requiring weight reduction and fatigue strength improvement at the same time.

Additionally, the peening apparatus and the peening method using the same according to an embodiment of this disclosure can generate a compressive residual stress to the inner surface by applying a wave, for example, an ultrasonic wave by means of a small probe.

Additionally, the peening apparatus and the peening method using the same according to an embodiment of this disclosure can be performed by the explosion of a cavity formed by a wave provided by the probe into a hollow inside of a pipe, a spring or the like.

The hollow inside is filled with the first fluid and the second fluid. The first fluid and the second fluid have a large difference in acoustic impedance. The probe is disposed such that it is submerged in a first fluid in a liquid phase to provide a wave.

The provided wave does not go out to the outside of the pipe member having a large acoustic impedance difference from the fluid, but travels in the extension direction of the pipe and is totally reflected at the interface (i.e., reflection surface) of the first fluid and the second fluid, which have a large acoustic impedance difference therebetween, to form a standing wave in the hollow inside.

The provided wave is reflected on the reflection surface to form a standing wave, and a cavity is generated in a portion where the pressure antinode of the standing wave is formed.

The cavity thus generated is grown to a critical volume and then exploded. When the cavity explodes, a shock wave is generated, and a compressive residual stress is generated on the inner surface surrounding the hollow inside by the shock wave.

Meanwhile, since the difference in acoustic impedance between the first fluid, the second fluid, and the pipe member is very large (for example, the difference in acoustic impedance between water and the metal pipe member is very large), the applied wave does not leak out of the pipe member. It is possible to form a standing wave with antinodes spaced apart from each other at regular intervals even in the inside of a long pipe member. Further, it is also possible to form a standing wave with pressure antinodes spaced apart from each other at regular intervals even in the inside of the pipe member P having a curved portion therein. The pressure antinodes can be formed at regular intervals along the extension direction of the pipe member P. Here, the extension direction of the pipe member P may be understood as the axial direction of the pipe member P.

The forming of a standing wave with pressure antinodes spaced apart at regular intervals enables peening position control through reflection surface position control. The adjustment of the position of the reflection surface may be implemented by adjusting the pressure of the second fluid (i.e., provided in the gas phase) in the hollow inside. Additionally, as the position of the reflection surface is adjusted, the positions of the pressure antinodes spaced apart from the reflection surface at regular intervals are also adjusted.

Accordingly, the position at which the pressure antinode of the wave, that is, the cavity, is generated can be easily and accurately adjusted. As a result, the peening operation is performed on portions of the inner surface surrounding the hollow inside, so that the position to which the compressive residual stress is generated can be easily and precisely adjusted.

As a result, a compressive residual stress can be is generated in an effective manner to an inner surface surrounding a hollow inside formed in a long bentpipe member, a spirally extending spring, or the like.

Additionally, according to the peening apparatus and the peening method using the same in accordance with an embodiment of this disclosure, a pipe or a spring, which is an object on which a peening operation is performed, and a peening apparatus performing peening thereon may be rotatably provided. By rotating the peening apparatus while maintaining the pressure of the supplied second fluid constant, the location of the reflection surface can be changed. At this time, the reflection surface may be maintained perpendicular to the inner surface of the pipe member P.

BRIEF DESCRIPTION OF DRAWINGS

The above and other objects, features and advantages of this disclosure will become more apparent to those skilled in the art by describing exemplary embodiments thereof in detail with reference to the accompanying drawings, in which:

FIGS. 4 and 5 are conceptual views showing a peening apparatus according to an embodiment of this disclosure;

DETAILED DESCRIPTION OF EXEMPLARY EMBODIMENTS

Hereinafter, the peening apparatus 10 according to an embodiment of this disclosure will be described in detail with reference to the accompanying drawings. In the following description, in order to clarify the characteristics of this disclosure, descriptions of some components may be omitted.

1. Definition of Terms

Further, when one element is referred to as being "connected" or "accessed" to another element, it should be understood that the one element may be directly connected or accessed to the other element or any intervening element may also be present therebetween.

On the contrary, when one element is referred to as being "directly connected" or "directly accessed" to another element, it should be understood as that no other element is present therebetween. As used herein, the singular forms may include the plural forms unless the context clearly indicates otherwise.

The term "fluid communication connection" or "communication" used in the following description means that they are connected to each other such that a fluid can flow from one member of two or more members to the other member. The fluid communication connection or communication may be formed using the piping such as a pipe, or a hose.

As used in the following description, the term "ultrasonic wave" refers to periodic sound pressure having a frequency exceeding the audible range of the human ear. In an embodiment, the ultrasonic wave may be a sound pressure having a frequency of 20 kHz or higher or lower in the range of 20 kHz.

The term "cavitation" used in the following description refers to a series of phenomena in which a cavity is formed/grown/exploded in a fluid due to a pressure change. In an embodiment, an impact may be applied to the inner surface of the pipe member P or the like through a process of explosion after the cavity is formed.

The term "peening" used in the following description refers to a series of processes for implementing a compressive residual stress by applying an external force to a surface of a metal or the like to improve material properties. The peening is performed to increase the fatigue life through the improvement of the fatigue strength of the surface by generating a compressive residual stress to the surface. In one embodiment, the peening may be performed by a shock wave generated by the explosion of the cavity generated during the ultrasonic application.

The term "pipe member P" used in the following description means any member having a hollow inside formed therein. The pipe member P may be formed in a straight or curved shape, or may be formed to include at least any one of a straight portion and a curved portion.

In one embodiment, the pipe member P may be formed to extend helically like a coil spring. In another embodiment, the pipe member P may be provided as a member including both a straight portion and a round portion, such as a stabilizer having a hollow inside therein.

That is, the pipe member P whose inner surface is subjected to the application of the compressive residual stress by the peening apparatus 10 and the peening method using the same according to the embodiment of this disclosure may be formed to include at least one curved round portion.

The "first fluid F1" and "second fluid F2" used in the following description refer to ones which are filled in the hollow inside H of the pipe member P, and which function as a medium allowing a wave W to travels. The first fluid F1 and the second fluid F2 do not mix with each other, and have different acoustic impedances.

Accordingly, the wave W provided from the first fluid F1 toward the second fluid F2 may be totally reflected on the reflection surface R.S, which is a surface where the first fluid F1 and the second fluid F2 meet.

In an embodiment, the first fluid F1 may be provided in a liquid phase. In addition, the second fluid F2 may be provided in a gas phase.

In the above embodiment, the first fluid F1 may be provided as water. In addition, the second fluid F2 may be provided as air.

In an embodiment in which the first fluid F1 is provided as water, a water supply may be provided.

In addition, in an embodiment in which the second fluid F2 is provided as air, an air supply may be provided.

In the following description, the term "reflection surface R.S" refers to a surface formed at a portion where the first fluid F1 and the second fluid F2 meet.

In the following description, it is assumed that the reflection surface R.S is formed by contacting two fluids having different acoustic impedances. Alternatively, a separate plate member or membrane member of a solid phase inserted in the hollow inside H may serve as the reflection surface R.S.

The peening apparatus 10 and the peening method using the same to be described below may be utilized for processing the inner surface of the pipe member P. Furthermore, the peening apparatus 10 and the peening method using the same may be utilized to clean the inner surface of the pipe member P.

2. Description of the Peening Apparatus 10
According to an Embodiment of this Disclosure The peening apparatus 10 according to an embodiment of this disclosure may be configured to apply the wave W to the inside of the pipe member P. The inner space of the pipe member P is filled with the first fluid F1 and the second fluid F2. A portion where the first fluid F1 and the second fluid F2 meet with each other may be defined as the reflection surface R.S.

At this time, due to the difference in acoustic impedance between the pipe member P and both the filled first and second fluids F1 and F2, the radiated wave W does not leak out of the pipe member P, and is totally reflected at the interface between the two fluids F1 and F2 to form a standing wave.

The cavities C may be intensively generated in the pressure antinodes AN formed by the wave W. This is because the cyclic pressure amplitude becomes maximum at the pressure antinode AN. The cavity C is grown by periodic pressure displacement.

The cavity C, which has grown to a size, that is, a critical size, may explode, thus transmitting a shock wave to the inner surface I.S of the pipe member P. A compressive residual stress may be generated on the inner surface I.S by the shock wave.

In addition, the first fluid F1 in which the generation and explosion of the cavity C occurs, and the pipe member P are provided to have different acoustic impedances. The first fluid F1 is provided to have a large difference in acoustic impedance from that of the pipe member P, so that the provided wave W may form a sound wave field only inside the pipe member P.

By using the wave W and the cavity C generated thereby as a means for generating a compressive residual stress by plastically deforming the inner surface I.S of the pipe member P, the peening apparatus 10 according to an embodiment of this disclosure may be utilized regardless of the shape of the pipe member P.

That is, the peening apparatus 10 according to an embodiment of this disclosure can be utilized when the pipe member P has a straight shape, a curved shape, and, furthermore, even a spiral shape such as a coil spring.

In addition, the provided wave W can be totally reflected by the reflection surface R.S defined by the interface between the first fluid F1 and the second fluid F2 filled in the pipe member P, and can be formed as a standing wave.

Figure 2:
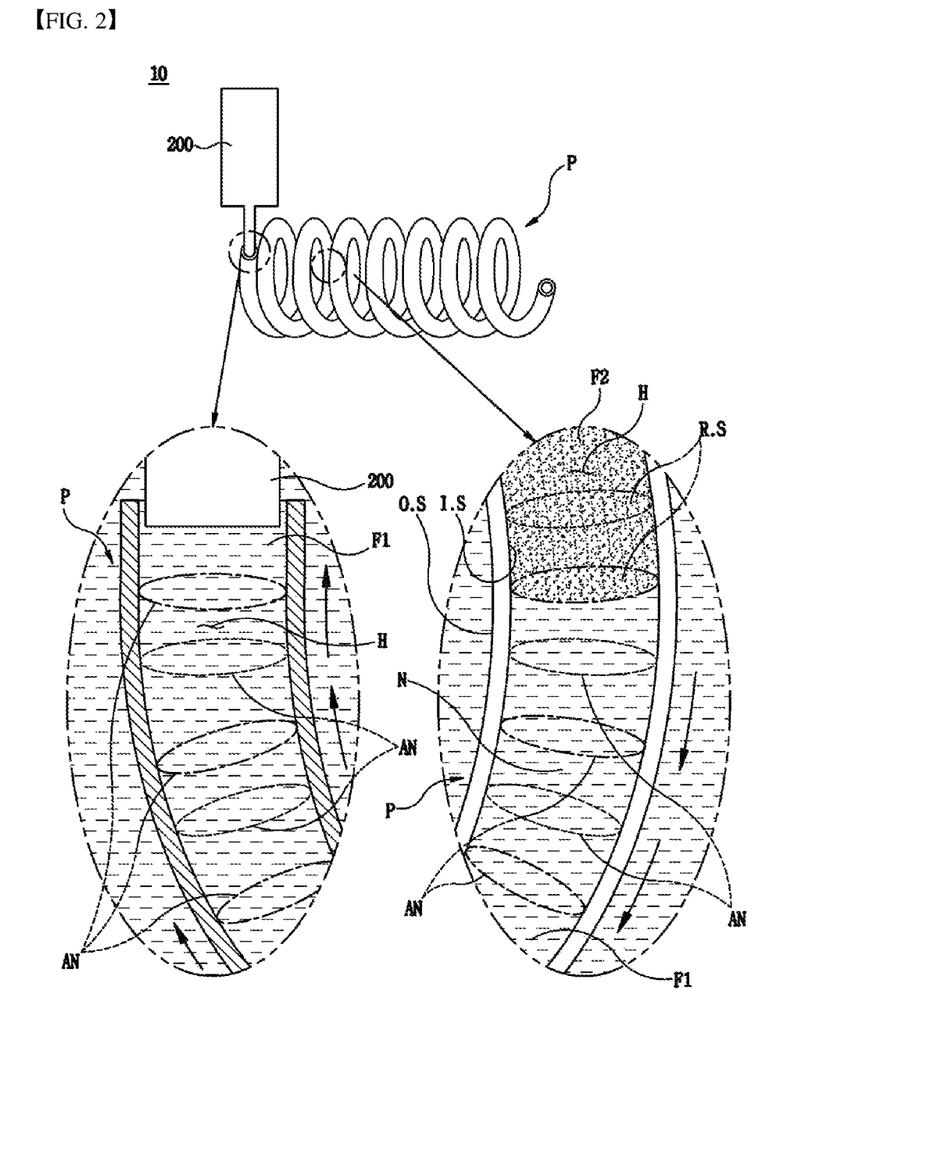
Figure 3:
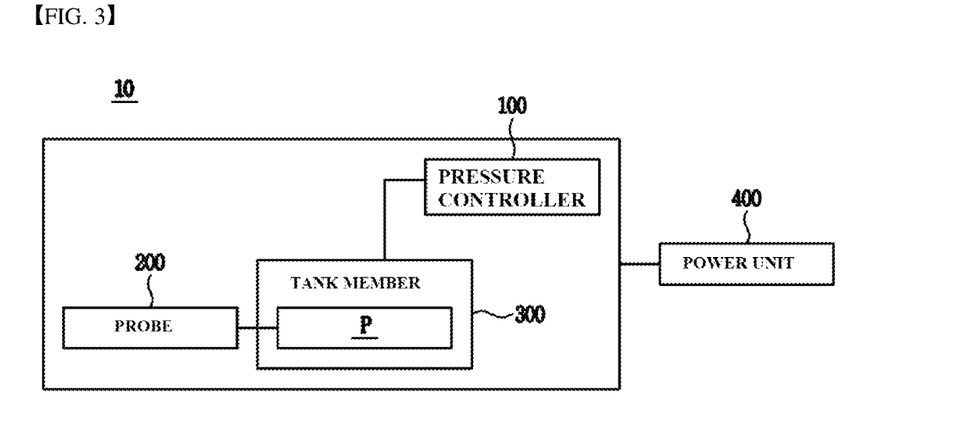
FIG. 3 is a block diagram showing a configuration of a peening apparatus according to an embodiment of this disclosure.

Furthermore, the position of the reflection surface R.S may be adjusted by adjusting the pressure of the second fluid F2 (or the supply amount of the fluid F2) supplied to the inside of the hollow H. That is, as shown in FIG. 2, the reflection position of the provided wave W and the position of the pressure antinode AN formed according to this can be set in the areas of the inner surface which the cavitation induced compressive residual stress generation is demanded.

Accordingly, the compressive residual stress produced by the cavitation can be generated in the demanded areas of the inner surface I.S surrounding the inner space of the pipe member P having a narrow width and volume. Accordingly, the fatigue strength of the pipe member P can be increased.

In an embodiment, the pipe member P may be provided as a coil spring or a stabilizer having a hollow inside.

It is premised that the pipe member P described below has a hollow inside H formed therein. Accordingly, the weight of the pipe member P can be reduced, so that weight reduction of other products manufactured with the pipe member P, for example, springs and the like can be achieved. The hollow inside H of the pipe member P is extended along the extending direction of the pipe member P, each end thereof in the extending direction may be formed open to communicate with the outside.

Meanwhile, after the peening process has been completed on the inner surface I.S of the pipe member P surrounding the hollow inside H, the opening located at each end thereof may be closed for actual use. Accordingly, corrosion or the like of the inner surface I.S during actual use can be prevented.

The hollow inside H may be filled with the first fluid F1 and the second fluid F2. In this case, the first fluid F1 and the second fluid F2 may be filled adjacently to different positions along the extending direction of the hollow inside H. In the embodiment shown in FIGS. 1 and 2, the first fluid F1 is relatively located on the left side, and the second fluid F2 is relatively located on the right side.

Figure 1:
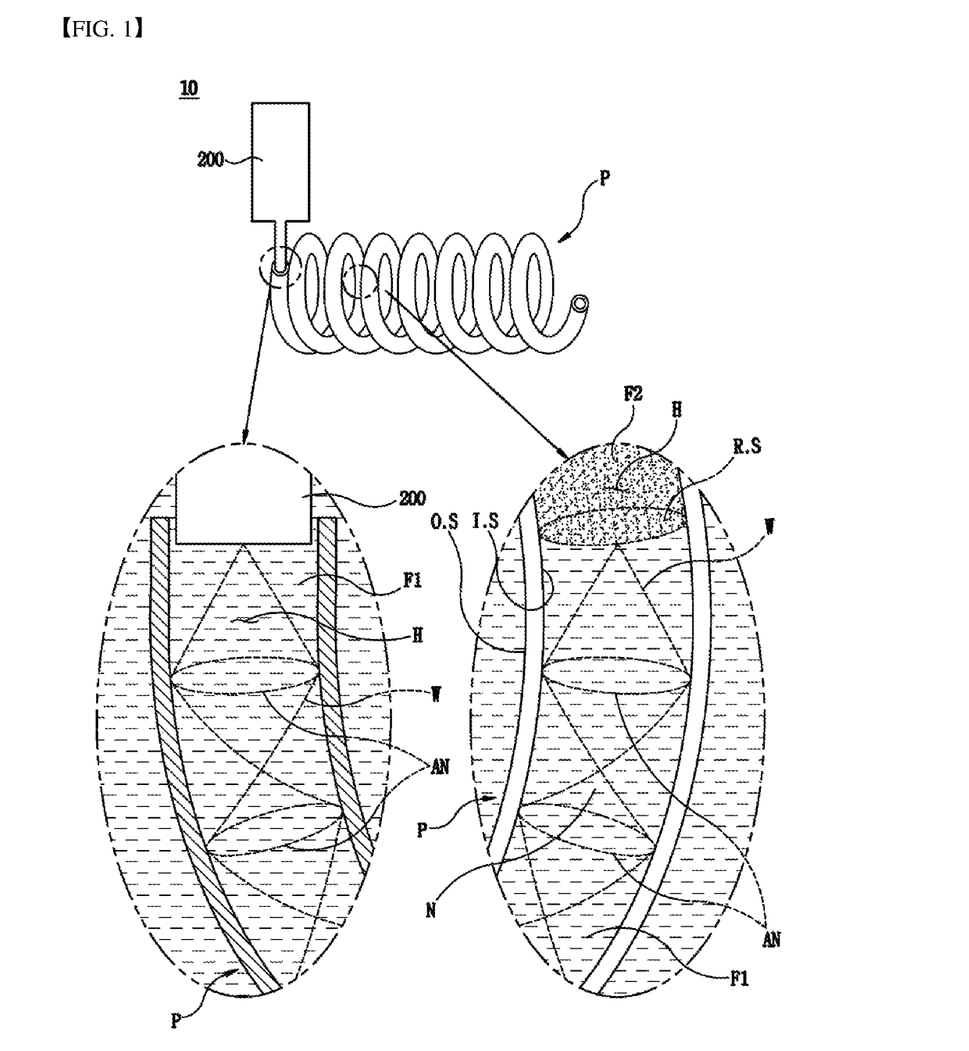
FIGS. 1 and 2 are conceptual views showing the principle of a peening apparatus according to an embodiment of this disclosure.
Figure 1:
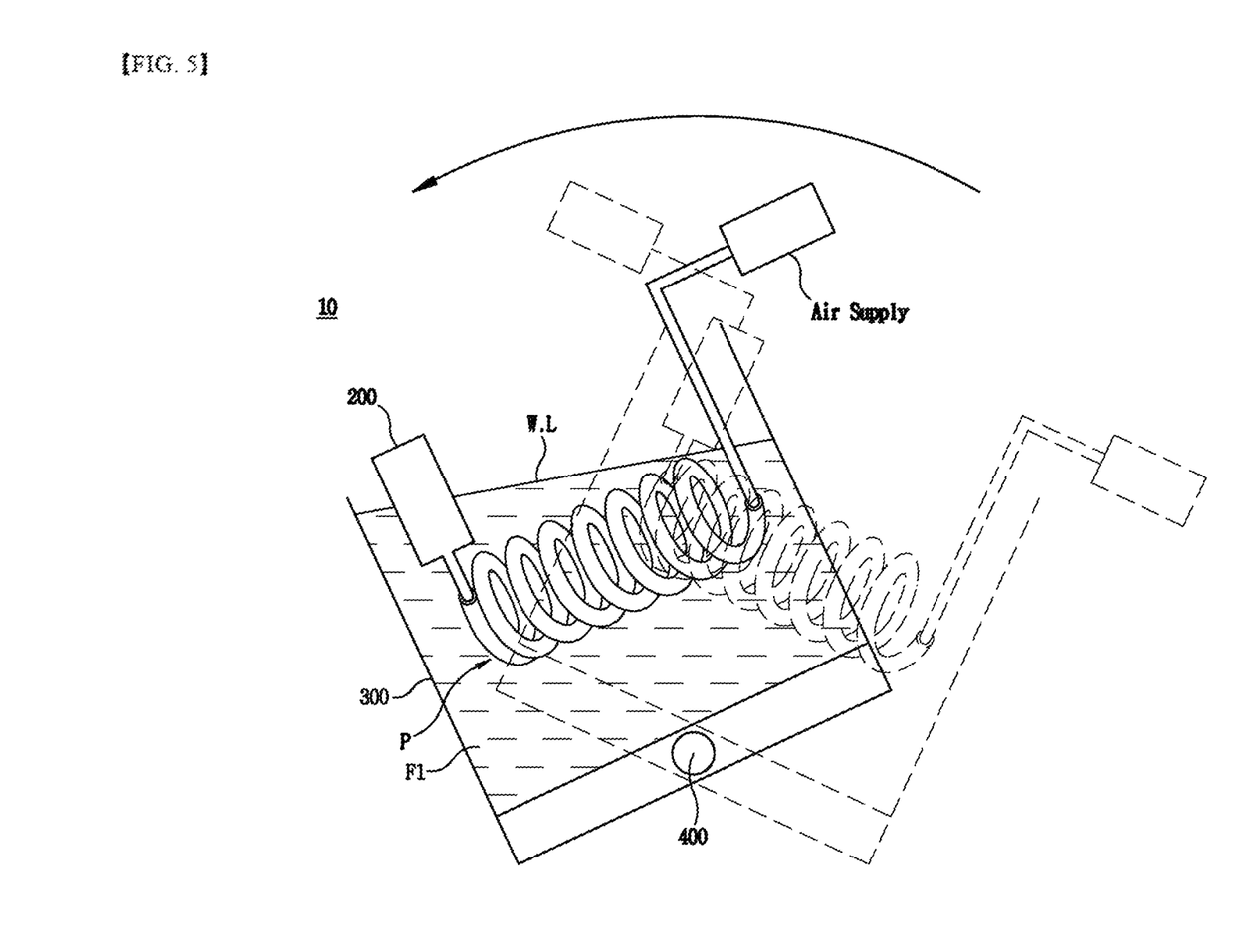

The probe 200 for applying the wave W may be inserted into the first fluid F1.

In the embodiment shown in FIGS. 1 and 2, the probe 200 is disposed to be partially submerged in the first fluid F1. The wave W provided from the probe 200 propagates along the direction in which the pipe member P extends. In other words, the wave W may be described as propagating toward the second fluid F2.

The surface where the first fluid F1 and the second fluid F2 meet with each other may be defined as the reflection surface R.S. As described above, the first fluid F1 and the second fluid F2 have different acoustic impedances.

Accordingly, the wave W provided from the probe 200 submerged in the first fluid F1 is totally reflected by the reflection surface R.S to form a standing wave.

At this time, the standing wave forms a plurality of pressure nodes N and pressure antinodes AN, and the cavities C are generated in the portions of the pressure antinodes AN having the greatest cyclic pressure amplitude.

In the pressure antinode AN of the wave W, the pressure amplitude is periodically changed, and thus the cavities C gradually grow and explode when they exceeds a critical size. The explosion of the cavity C releases a shock wave to the inner surface I.S of the pipe member P, and accordingly, a compressive residual stress may be produced on the inner surface I.S.

As a result, by the shock wave generated by the explosion of the cavity C may generate plastic deformation and compressive residual stress on the inner surface I.S of the pipe member P.

The position of the pressure anti-node AN where the cavity C is most expected may be determined according to the position of the reflection surface R.S formed at a portion in which the first fluid F1 and the second fluid F2 injected into the hollow inside H contact with each other. Accordingly, when the position of the reflection surface R.S is changed by adjusting the pressure or the supply amount of the second fluid F2 in the gas phase accommodated in the hollow inside H, the position of the pressure antinode AN can also be changed.

The foregoing will be described in detail with reference to FIG. 2 as follows.

In FIG. 2, the pressure antinode AN and the reflection surface R.S indicated by the broken line refer to ones before the position change, and the pressure antinode AN and the reflection surface R.S indicated by the dashed dotted line refer to ones after the position change.

Referring to the enlarged view shown on the right side of FIG. 2, the position of the reflection surface R.S is shifted downward (the reflection surface R.S represented by the dashed dotted line). Accordingly, the position of the pressure antinode AN formed by the standing wave reflected by the reflection surface R.S is also shifted as much as R.S is shifted (the pressure antinode AN represented by the dashed dotted line).

Referring to the enlarged view shown on the left side of FIG. 2, a state in which the pressure antinode AN is moved according to the position change of the reflection surface R.S is shown.

That is, in the enlarged view shown on the left side of FIG. 2, the new pressure antinode AN (pressure antinode AN represented by the dashed dotted line) is moved relative to the old pressure antinode AN (pressure antinode AN represented by the broken line).

As a result, by continuously changing the position of the reflection surface R.S, the entire inner surface I.S. can undergo a constant compressive residual stress The left enlarged view depicted in FIGS. 1 and 2 conceptually shows the inside of a portion of the pipe member P near a connection to the probe 200, and the right enlarged view conceptually shows the inside of a portion of the pipe member P near the location where the reflection surface R.S is formed.

Hereinafter, the peening apparatus 10 according to an embodiment of this disclosure will be described in detail with reference to FIGS. 1 to 5. In the illustrated embodiment, the peening apparatus 10 includes a controller 100, a probe 200, a tank member 300, and a power unit 400.

The control of the position of the reflection surface inside the hollow pipe filled with the first fluid and the second fluid is implemented through the controller 100 connected to the second fluid in the gas phase. The controller 100 is to change the position of the reflection surface by changing the static pressure at the position of the reflection surface and/or the supply amount of the second fluid.

The controller 100 may adjust the supplied flow rate and pressure of the second fluid (gas) supplied into the inside of the pipe member P. In addition, the controller 100 may sense the amount of the first fluid (liquid) filled in the pipe member P.

The probe 200 applies the wave (W) into the hollow inside H of the pipe member P. The applied wave W may create a cavity C on the inner surface I.S surrounding the hollow inside H. Specifically, the cavity C can be formed in the pressure antinode AN portion of the standing wave formed by the wave W being reflected by the reflection surface R.S.

As described above, a compressive residual stress can be generated on the inner surface I.S of the pipe member P by a shock wave generated as the generated cavity C grows and explodes.

The probe 200 may be partially inserted in the hollow inside H. Referring to FIG. 1, the probe 200 is inserted in the hollow inside H so that the end thereof is submerged in the first fluid F1. It will be understood that the wave W may be generated from the end of the probe 200.

The probe 200 may be formed to have a small size. Specifically, the probe 200 may be formed to include a portion having a cross section smaller than the cross section of the hollow inside H, so that it can be accommodated in the hollow inside H.

The tank member 300 accommodates the pipe member P and the first fluid F1 to be filled in the pipe member P. The pipe member P is accommodated in the tank member 300, and is disposed so that a portion thereof is submerged in the first fluid F1.

Figure 4:
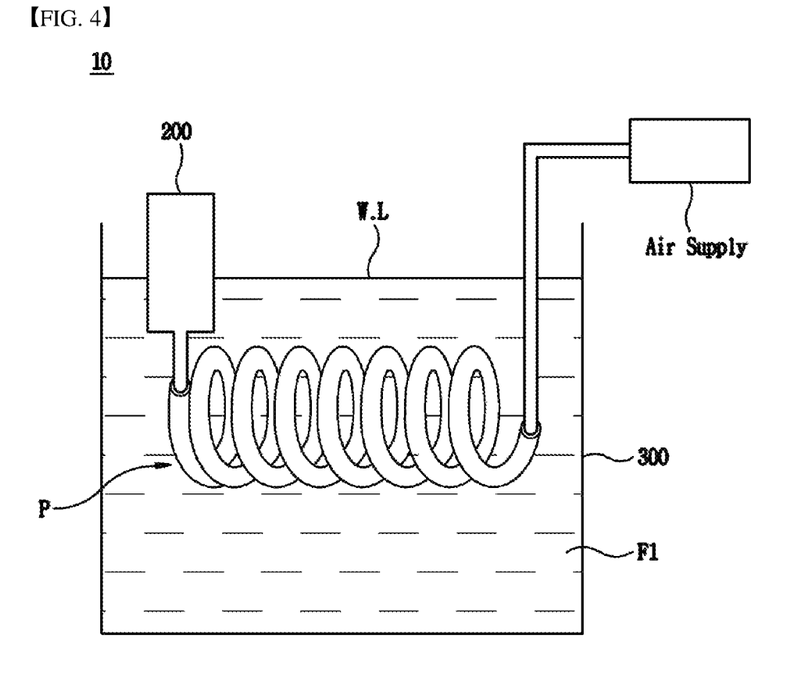

In an embodiment shown in FIGS. 4 and 5, the pipe member P is disposed to be completely submerged in the first fluid F1 accommodated in the tank member 300. The ratio indicating how much the pipe member P is submerged in the first fluid F1 may be changed.

In another embodiment, the pipe member P may be disposed in a state that it is not accommodated in the tank member 300. In the above-described embodiment, the pipe member P may be provided in a state that the first fluid F1 is supplied in the hollow inside H thereof. In this case, the amounts of the first fluid F1 and the second fluid F2 supplied to the hollow inside H may be adjusted by the controller 100.

That is, even in the embodiment in which the tank member 300 is excluded, meaning that the first and second fluid are only contained in the pipe, the process of generating the compressive residual stress on the inner surface I.S of the pipe member P can be performed just as in the embodiment in which the tank member 300 is employed.

The first fluid F1 accommodated in the tank member 300 may be supplied from an external fluid supply unit (not shown). In the above embodiment, the tank member 300 may be connected in fluid communication with an external fluid supply unit (not shown).

When the tank member 300 rotates while maintaining a constant static pressure of the second fluid in the gas phase at the reflection surface, the position of the reflection surface can be changed while maintaining a constant angle between the reflection surface and the inner surface. That is, the power unit 400 to be described later may rotate the tank member 300 in any one of a clockwise direction and a counterclockwise direction. The tank member 300 may be rotated together with other components of the peening apparatus 20, such as, the probe 200.

Although not shown, a cover member (not shown) may be provided on the tank member 300. The cover member (not shown) closes the opening of the tank member 300 to prevent accidental leakage of the first fluid F1 and the pipe member P accommodated therein when the tank member 300 is rotated.

The power unit 400 provides power to rotate other components of the peening apparatus 20. In one embodiment, the power unit 400 can rotate the controller 100, the probe 200, the tank member 300, and the pipe member P filled with the first fluid F1 and the second fluid F2.

Accordingly, when the position of the reflection surface is adjusted while the angle between the reflection surface R.S and the inner surface I.S is kept constant, the pattern of standing waves continuously formed according to the position of the reflection surface remains unchanged. As a result, the accuracy of the control of the pressure antinodes AN of the standing wave and the position control of the generated cavity C can be improved.

The power unit 400 is connected to the pipe member P and other components of the peening apparatus 20. The power unit 400 may rotate the pipe member P and other components of the peening apparatus 20.

In the embodiment shown in FIG. 5, the power unit 400 may rotate the pipe member P and other components of the peening apparatus 20 using the bottom platform of the tank member 300 as an axis (in an arrow direction shown in FIG. 5).

The power unit 400 may be provided in any form capable of rotating the pipe member P. In one embodiment, the power unit 400 may be provided in the form of an electric motor, such as a motor. In the above embodiment, the power unit 400 may be connected to an external power source (not shown) to be operated, and may receive power required for the rotation. The rotational speed and rotational direction of the power unit 400 may be adjusted.

Although not shown, the peening apparatus 10 may be provided with a pre-load applying unit (not shown). The pre-load applying unit (not shown) may apply, to the pipe member P, a load having the same form as the in-service load applied to the pipe member P in actual use, for example, the in-service load to which the car coil spring is subject to. In this case, the pre-load applying unit (not shown) may be configured to apply a load to the pipe member P before the probe 200 applies the wave W.

For example, the pre-load applying unit (not shown) may pre-load the pipe member P in a way the pipe is loaded in the service.

For the case where the pipe member P is used as a coil spring, the pipe can be preloaded in a way the coil spring is loaded in the service.

In an embodiment in which the pipe is preloaded, the effect of compressive residual stress generation by the cavity can be enhanced in the area where tensile stress is obtained by the pre-load.

FIGS. 1, 2, 4, and 5 show the pipe member P to which the compressive residual stress is achieved by the peening apparatus 10 according to the present embodiment.

In the illustrated embodiment, the pipe member P is provided in the form of a coil spring extending helically. The hollow inside H, which is a space formed by being surrounded by the outer surface O.S and the inner surface I.S, is formed in the pipe member P.

The hollow inside H extends in the direction in which the pipe member P extends. In the illustrated embodiment, as the pipe member P is formed in a spiral shape, it will be understood that the hollow inside H is also formed in a spiral shape. Each end of the hollow inside H in the extending direction may be formed open to communicate with the outside.

As shown in FIGS. 1 and 2, the probe 200 may be partially inserted into one end (the upper end in the illustrated embodiment) of the hollow inside H. The end of the probe 200 is accommodated in the hollow inside H, so it is possible to effectively apply the wave W to the hollow inside H. As described above, the probe 200 may also be provided to apply the wave W to the hollow inside H from the outside of the hollow inside H.

In the embodiment shown in the enlarged views of FIGS. 1 and 2, the probe 200 is disposed such that it is submerged in the first fluid F1 in the liquid phase to apply the wave W.

As described above, the cavities C are generated, grow, and explode in the pressure antinode AN portion formed by the standing wave formed by reflecting the applied wave W from the reflection surface R.S.

By the shock wave generated by the explosion of the cavity C, a compressive residual stress may be generated on the inner surface I.S.

In the above-described peening apparatus 10, the reflection surface R.S may be formed in the middle portion of the extending direction of the pipe member P. The peening apparatus 10 may generate compressive residual stress on the inner surface I.S of one side and the other side with respect to the reflection surface formed in the middle portion of the pipe member P separately.

Specifically, the probe 200 may be first inserted into one end of the pipe member P with respect to the reflection surface R.S, and may generate a compressive residual stress on the half portion biased to the one side of the pipe member P.

When the above process is completed, the probe 200 may be inserted into the other end of the pipe member P with respect to the reflection surface R.S, and may generate a compressive residual stress to the other half of the pipe member P that is biased toward the other side.

This is because there is a concern that, when the extension length of the pipe member P is excessive, the extension length of the standing wave field is also increased, so that the strength of the ultrasonic wave in the hollow inside H may be weakened. Accordingly, in the present embodiment, since the pipe member P is properly partitioned and partitioned portions thereof are respectively subjected to the compressive residual stress generation, the extension length of each respective standing wave field is less so that the strength of the standing wave is less weakened accordingly compared to the case engaging the entire pipe without the partition.

3. Description of the Peening Method According to an Embodiment of this Disclosure The peening method according to the embodiment of this disclosure may be performed by the peening apparatus 10 according to the above-described embodiment.

Hereinafter, a peening method according to an embodiment of this disclosure will be described in detail with reference to FIGS. 6 to 9.

Figure 6:
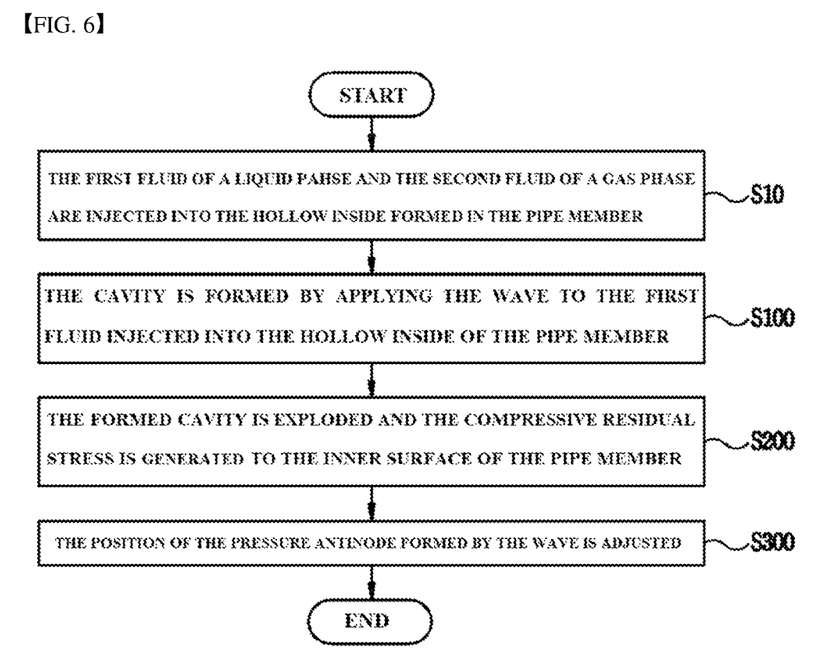
FIG. 6 is a flowchart showing a flow of a peening method using a peening apparatus according to an embodiment of this disclosure.

Referring to FIG. 6, the peening method according to the illustrated embodiment includes injecting the first fluid F1 and the second fluid F2 into the hollow inside H formed in the pipe member P (S10); forming a cavity C by applying a wave W to the first fluid F1 injected into the hollow inside H of the pipe member P (S100); generating a compressive residual stress on the inner surface I.S of the pipe member P when the formed cavity C is exploded (S200); controlling the position of the pressure antinode AN formed by the wave W (S300).

Additionally, injecting the first fluid F1 in the liquid phase and the second fluid F2 in the gas phase into the hollow inside H formed in the pipe member P (S10) may precede the steps S100, S200, and S300 to be described later.

(1) Description of the Step S100 in which a Cavity C is Formed by Applying a Wave W to the First Fluid F1 Injected into the Hollow Inside H of the Pipe Member P In this step S100, the probe 200 is inserted into the hollow inside H of the pipe member P, and applies the wave W, and the wave W is totally reflected by the reflection surface R.S to form a standing wave, by which the cavity C is formed in the pressure antinode AN portion. Hereinafter, this step S100 will be described in detail with reference to FIG. 7.

Figure 7:
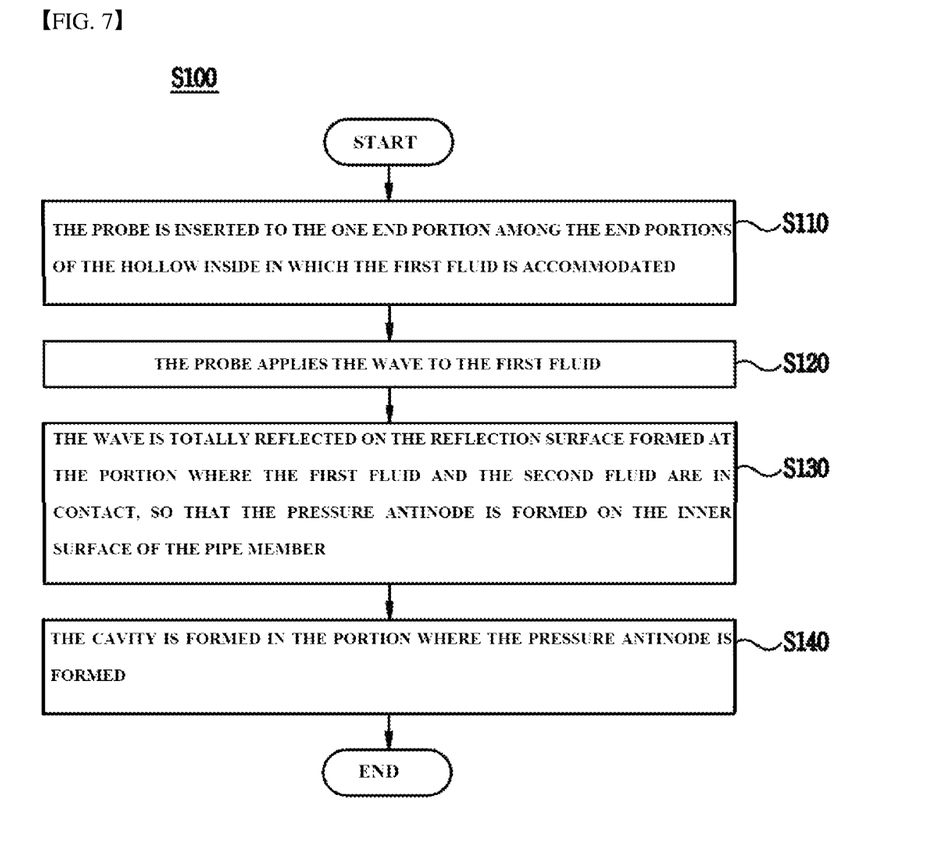
FIG. 7 is a flowchart showing a detailed flow of the step S100 of the peening method of FIG. 6.

The probe 200 is positioned adjacent to the end of the hollow inside H. Specifically, the probe 200 is located adjacent to the one end portion among the end portions of the hollow inside H in the extending direction of the pipe member P, in which the first fluid F1 in the liquid phase is accommodated (S110).

The probe 200 applies the wave W to the first fluid F1 (S120).

The wave W is totally reflected by the reflection surface R.S formed at the portion where the first fluid F1 and the second fluid F2 are in contact with each other, and becomes a standing wave. Accordingly, the wave W, which has become the standing wave, forms a pressure node N and a pressure antinode AN, and the pressure antinode AN is formed inside the pipe member P (S130).

As described above, the pressure antinode AN is a point at which the cyclic pressure amplitude is maximum. Accordingly, the cavities C are intensively formed at the positions where the pressure antinodes AN are formed (S140).

(2) Description of the Step S200 in which the Formed Cavity C is Exploded and the Compressive Residual Stress is Generated on the Inner Surface I.S of the Pipe Member P This step S200 is a step S200 of generating a compressive residual stress on the inner surface I.S of the pipe member P by a shock wave generated by the growth and explosion of the formed cavity C, that is, a step S200 in which a peening operation is performed. Hereinafter, this step S200 will be described in detail with reference to FIG. 8.

Figure 8:
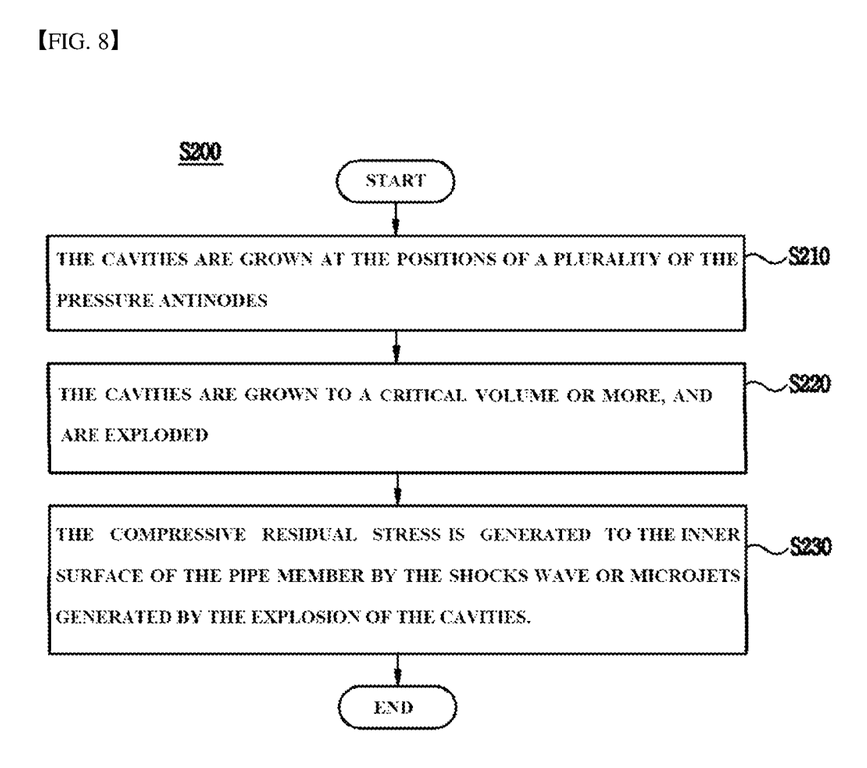
FIG. 8 is a flowchart showing a detailed flow of the step S200 of the peening method of FIG. 6.

There may be a plurality of pressure antinodes AN formed by the wave W becoming a standing wave. The plurality of pressure antinodes AN are spaced apart from each other along the direction in which the pipe member P extends, and are located on the inner surface I.S.

The cavity C grows at the positions of the plurality of pressure antinodes (S210). When the growth of the cavity C continues and exceeds the critical size, the cavity C is exploded and a shock wave or microjet is emitted (S220).

The shock wave emitted by the cavity C impacts on the inner surface I.S of the pipe member P. Accordingly, the inner surface I.S may undergo the plastic deformation by the shock wave and may be followed by the compressive residual stress generation (S230).

(3) Description of the Step S300 in which the Position of the Pressure Antinode AN Formed by the Wave W is Controlled This step S300 is a step S300 of controlling the position of the pressure antinode (AN) where the cavity C is generated and grows, in order to generate the compressive residual stress uniformly in the entirety of the inner surface I.S or the part where the peening is demanded or desired. Hereinafter, this step S300 will be described in detail with reference to FIG. 9.

Figure 9:
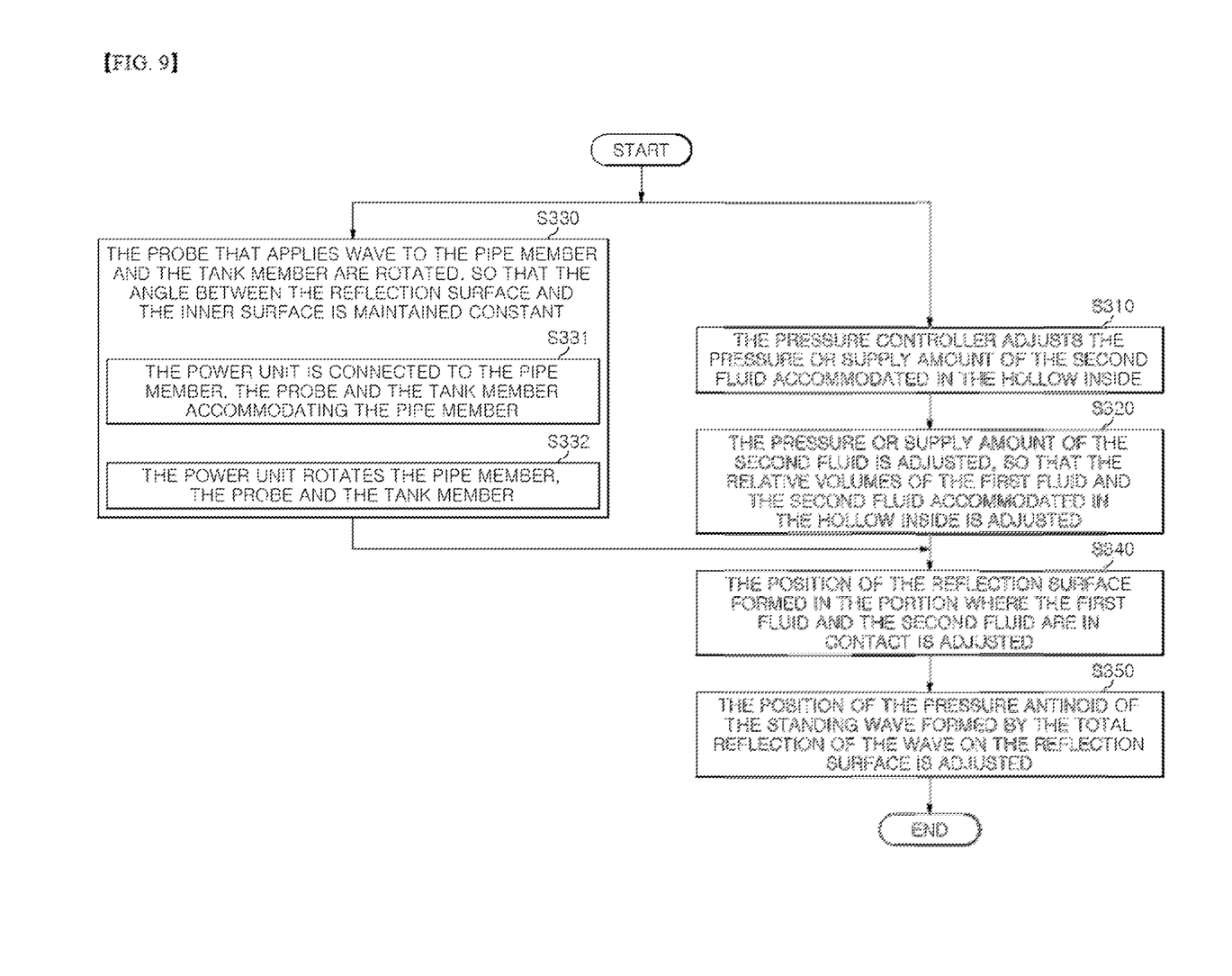
FIG. 9 is a flowchart showing a detailed flow of the step S300 of the peening method of FIG. 6.

The controller 100 controls the pressure and/or the supply amount of the second fluid F2 accommodated in the hollow inside H (S310). To this end, the controller 100 is connected to the hollow inside H as described above.

Meanwhile, in order to control the position of the reflection surface R.S more accurately, the pipe member P, the step S330 may be further performed in which the probe 200 that applies the wave W to the pipe member P, and the tank member 300 are rotated together. The step S330 is a step S340 in which the position of the reflection surface R.S is controlled while maintaining a constant relative angle between the reflection surface R.S and the inner surface I.S.

First, the power unit 400 is connected to the pipe member P, the probe 200 and the tank member 300 (S331). Although not shown, other components of the peening apparatus 10, for example, the controller 100 may also be connected to the power unit 400.

Next, the power unit 400 rotates the pipe member P, the probe 200, and the tank member 300 (S332). At this time, the pressure of the second fluid F2 supplied to the hollow inside H by the controller 100 is maintained constant.

Although not shown, other components of the peening apparatus 10, for example, the controller 100 may also be rotated together.

That is, when the pipe member P is rotated in a state in which the pressure in the hollow inside H is constantly maintained by the controller 100, the position of the reflection surface R.S may be controlled while the angle between the reflection surface R.S and the inner surface I.S is constantly maintained.

When this step S330 is additionally performed, the positions of the reflection surface R.S and the corresponding pressure antinode AN can be controlled more accurately compared to the case of adjusting the position of the reflection surface R.S by adjusting only the pressure or supply amount of the second fluid F2.

The pattern of the pressure antinodes AN of the standing wave according to the change in the position of the reflection surface R.S can be expected to be generally maintained the same.

At this time, when the angle between the reflection surface R.S and the inner surface I.S is kept constant, the sameness of the pattern of the pressure antinode AN may be improved. As a result, the position of the cavity C and the position where the compressive residual stress is generated can be more precisely controlled.

As the pressure and/or supply amount of the second fluid F2 accommodated in the hollow inside H is controlled by the controller 100 (S320), the position of the reflection surface R.S formed at the portion where the first fluid F1 and the second fluid F2 are in contact is controlled (S340).

In addition, as the pipe member P, the probe 200, and the tank member 300 are rotated together and the angle and position of the reflection surface R.S are controlled (S330), the position of the reflection surface R.S formed at a portion where the first fluid F1 and the second fluid F2 are in contact may be controlled. (S340).

Through the above steps S310, S320, S330 and S340, the position of the pressure antinode AN of the standing wave formed by the total reflection of the wave W applied to the hollow inside H to the reflection surface (RS) is changed (S350) (see FIG. 2). As a result, the position of the cavity C formed in the pressure antinode AN may also be changed.

While the preferred embodiments of this disclosure have been referred to and described above, those of ordinary skill in the art can appreciate that various modifications and variations of this disclosure can be made without departing from the spirit and scope of this disclosure as set forth in the claims below.

REFERENCE SIGN LIST

10: Peening apparatus
100: Controller
200: Probe
300: Tank member
400: Power unit
F1: First fluid
F2: Second fluid
H: Hollow inside
I.S: Inner surface
O.S: Outer surface
N: Pressure node
AN: Pressure antinode
C: Cavity
P: Pipe member
R.S: Reflection surface
W: Wave
W.L: Water line

What is claimed is:

1. A peening apparatus for generating a compressive residual stress on a pipe member including at least one curved round portion and having a hollow inside formed therein in which a first fluid is accommodated on one side and a second fluid, which is in a gas phase, is accommodated on an other side, the apparatus comprising:
a probe which is disposed such that it is submerged in the first fluid supplied to the hollow inside, and which is configured to apply a wave to the first fluid, and
a power unit which is connected to the probe and the pipe member, and which is configured to rotate the probe and the pipe member together,
wherein the first fluid and the second fluid have different acoustic impedances, so that the wave is totally reflected on a reflection surface where the first fluid and the second fluid are in contact, and forms a standing wave, wherein a cavity generated and grown in the a pressure antinode of the formed standing wave is exploded and emits a shock wave or microjet, which generates a compressive residual stress to an inner surface of the pipe member surrounding the hollow inside, and
wherein as the probe and the pipe member are rotated together while keeping a pressure of the second fluid constant, a position of the reflection surface relative to the inner surface of the pipe member is adjusted while the angle between the reflection surface and the inner surface of the pipe member is maintained at a predetermined angle.

2. The apparatus of claim 1, wherein a plurality of pressure antinodes are formed to be spaced apart from each other by a predetermined distance along the inner surface of the pipe member, and
wherein the cavity is grown to a critical volume along the plurality of pressure antinodes, and then is exploded.

3. The apparatus of claim 1, further comprising a controller in communication with the hollow inside in the pipe member, and configured to change the pressure or supply amount of the second fluid accommodated in the hollow inside.

4. The apparatus of claim 3, wherein when the pressure or supply amount of the second fluid in the hollow inside is controlled, the position of the reflection surface is moved along the extension direction of the pipe member.

5. The apparatus of claim 1, further comprising a tank member accommodating the first fluid and the pipe member (P), wherein the pipe member is disposed such that it is submerged in the first fluid accommodated in the tank member.

6. The apparatus of claim 5, wherein the power unit is configured to rotate the probe, the pipe member, and the tank member accommodating the pipe member, together.

7. The apparatus of claim 1, wherein the reflection surface is provided as a plate member or a membrane member of a solid phase inserted into the hollow inside.

8. The apparatus of claim 1, further comprising a pre-load applying unit capable of applying a pre-load to the pipe member P in a way that the pipe member P is loaded in a service.

9. A peening method for generating a compressive residual stress on the a pipe member having a hollow inside formed therein, using the peening apparatus of claim 1, the method comprising:
  (a) injecting the first fluid in a liquid phase and the second fluid in a gas phase into the hollow inside formed in the pipe member;
  (b) forming a cavity by applying a wave to the first fluid injected into the hollow inside of the pipe member;
  (c) generating a compressive residual stress on the inner surface of the pipe member (P) by the formed cavity being exploded; and
  (d) controlling the position of a pressure antinode formed by the wave.

10. The method of claim 9, wherein the step (b) includes:
  (b1) locating the-a probe adjacent to one end among the ends of the hollow inside, in which the first fluid is accommodated;
  (b2) applying the wave to the first fluid by the probe;
  (b3) forming a standing wave by the wave being totally reflected on a reflection surface formed in a portion where the first fluid and the second fluid are in contact, while forming the pressure antinode on the inner surface of the pipe member; and
  (b4) forming the cavity in a portion where the pressure antinode is formed.

11. The method of claim 9, wherein a number of the pressure antinodes is plural, and they are formed spaced apart from each other on the inner surface along the extending direction of the pipe member, and wherein the step (c) includes:
  (c1) growing the cavity at the positions of a plurality of the pressure antinodes;
  (c2) exploding the cavity by growing the cavity to a critical volume or more; and
  (c3) generating a compressive residual stress to the inner surface of the pipe member (P) by a shock wave or microjet generated by the explosion of the cavity.

12. The method of claim 9, wherein the step (d) includes:
  (d1) controlling, by a controller, the pressure or supply amount of the second fluid accommodated in the hollow inside;
  (d2) controlling the relative volumes of the first fluid and the second fluid accommodated in the hollow inside by controlling the pressure or supply amount of the second fluid;
  (d3) controlling the position of a reflection surface formed at a portion where the first fluid and the second fluid are in contact; and
  (d4) controlling the position of the pressure antinode of a standing wave formed by total reflection of the wave on the reflection surface.

13. The method of claim 12, wherein the step (d) further includes:
  after the step (d2) and before the step (d3), (d2') maintaining an angle between the reflection surface and the inner surface constant by the controller maintaining the pressure of the second fluid constant, and by rotating the pipe member, the probe for applying the wave to the pipe member, and a tank member.

14. The method of claim 13, wherein the step (d2') includes:
  (d21') connecting a power unit to the pipe member, the probe, and the tank member accommodating the pipe member; and
  (d22') rotating, by the power unit, the pipe member, the probe, and the tank member.

* * * * *